3,451,884
WATERPROOF PILE COATED SHEET
FOR LAMINATING
Takamitsu Anno, Tokyo, Kohei Masuda, Yokkaichi-shi, Kikuo Hachiya, Tokyo, and Takeo Hattori, Yokkaichi-shi, Japan, assignors, by direct and mesne assignments, of one-half each to Mitsubishi Petrochemical Company Limited, Tokyo, Japan, and Koken Kaihatsu Kabushiki Kaisha, Tokyo, Japan
Filed July 30, 1965, Ser. No. 476,045
Claims priority, application Japan, Aug. 5, 1964, 39/43,944
Int. Cl. B32b 19/08, 19/02, 13/12
U.S. Cl. 161—53                                2 Claims

ABSTRACT OF THE DISCLOSURE

A waterproof sheet is provided which consists of a film base of a susbtance such as ethylene-vinyl acetatae copolymer or ethylene-propylene copolymer, there being asbestos piles extending into and embedded in the film. A hydraulic cement layer can be connected to the sheet through the intermediary of the asbestos piles.

---

Figure 1:
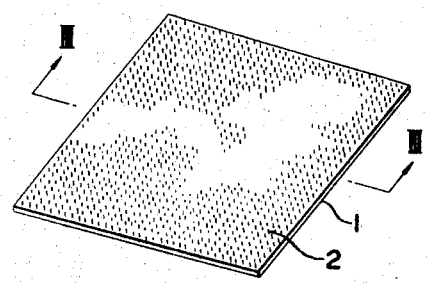

The present invention relates to a novel waterproof sheet to be used for constructions and public works, and a method of preparing same, and also a simple and economical method of waterproofing the structures and objects of public works using same. More particularly, the present invention relates to a waterproof sheet for constructions and public works use comprising a film of elastic ethylenic copolymer, for instance, ethylene-vinyl acetate copolymers or ethylene-propylene copolymers and fibers or particles adhered to at least one side of said film in such a manner that a partial portion of individual body of said fibers or particles is embedded into surface of said film. In the present specification, said fibers or particles will be hereinafter referred to as "piles" for simplicity.

Heretofore, an asphalt has been widely used for waterproofing of constructions and public works, however, such asphalt waterproofing has disadvantages of peeling off due to insufficient adhesion to the concrete base, or becoming obsolete of waterproofing due to cracking of water resistant layer when concrete base is cracked. Besides, there were many inconveniences in using asphalt of going through procedures such as heat-melting and preliminary coating of primer before applying an asphalt on concrete base. The use of film of plastics as waterproof sheet has also been proposed heretofore, however, in this case, the plastic film is merely placed upon concrete base, thus, the adhesion is insecurely maintained thereby causing inconvenience of peeling off particularly when applied for waterproofing of parapets and other up-rising portions or vertical walls of structures.

An object of the present invention is to overcome such disadvantages mentioned hereinabove which are owing to conventional methods of waterproofing using asphalt or plastic film known heretofore. Another object of the present invention is to provide an improved waterproof sheet having excellent adhesive properties to concrete base and at the same time highly resistant to breakage due to good extensibility of film body upon cracking of concrete base onto which it is adhered. Still another object of the present invention is to provide a waterproof sheet to be used for constructions and public works which has excellent adhesive properties to concrete base as mentioned hereinabove and which does not break upon cracking of the concrete base.

These objects of the present invention mentioned heretofore are to be accomplished by a novel waterproof sheet of the present invention comprising a film base of ethylenic copolymer such as ethylene-vinyl acetate copolymers, having lower modulus of elasticity and having rubber-like properties and piles adhered to at least one side of said film in such a manner that a partial portion of individual body of said piles is embedded into surface of said film.

As a film base of waterproof sheet of the present invention, any ethylenic copolymer having lower modulus of elasticity than that of polyethylene and having rubber-like properties may be used, however, particularly, ethylene-vinyl acetate copolymers or ethylene-propylene copolymers, such as ethylene-propylene rubber, are most preferable.

As fibers and particles to be adhered onto said film, organic or inorganic fibers and particles, for example, such as, polyolefin, polyamide, polyester, polyvinyl alcohol fiber (trademark of polyvinylalcohol fibers sold by Kurashiki Rayon Kabushiki Kaisha, Japan), etc., and asbestos, pumice, vermiculite, slag, glass, etc., may be used.

Heretofore, as the methods of depositing said piles onto a plastic film base, both mechanical and electrostatic methods are known. The former method includes scattering-method in which said piles are scattered evenly onto a film base coated with adhesives, after which the film is pressed by a pair or squeezing rolls and dried; spraying-method wherein said piles are sprayed onto a film base coated with adhesives as in the above using a flock gun; and vibrating-method in which a film base coated with adhesives is given mechanical vibration while said piles are being deposited onto said film base so that said piles are in vertical or up-right positions. The latter being method of depositing said particles vertically onto film base which is placed in electrostatic field by means of attraction force created by said electrostatic field and this method includes fixed system, semi-fixed system, continuous system, flock printing wheel system and depositing system in situ, depending upon the type of apparatus to be used.

As mentioned hereinabove, there are many ways of depositing piles onto film base, however, they all make use of adhesives of various kinds. As the adhesives, natural paste, natural latex, dough, etc., were used in the past, however, nowadays, adhesives involving emulsion of polyvinyl acetate, polyester, and synthetic rubber, and also adhesives of solvent type have been used. However, in depositing piles onto the film base of which surface is extremely inert, such as films of ethylenic copolymers, no suitable adhesives are available, nor, sufficient adhesion is obtainable with any adhesives known heretofore even after the surface treatment of such film base by means of oxidation or others, therefore, as a matter of reality, no products of these piled films are obtained presently.

The present invention provides a method of depositing said piles onto these ethylenic copolymer films securely by simplified process, as well as economically, overcoming these difficulties encountered in the methods known heretofore while using conventional adhesives. The principle of method of the present invention is based on the discovery that sufficient adhesive strength is obtainable without using any adhesives by melting said ethylenic copolymer film and depositing said piles thereon while said ethylenic copolymer film is still softened, and hardening said film by cooling it off.

According to a series of experiments conducted by us, conventional methods of depositing said piles onto film base as described hereinbefore, for instance, mechanical and electrostatic methods of deposition, are readily applicable for ethylenic copolymer films which are in softened status, as they are. Namely, according to the present invention piles are to be deposited onto ethylenic copolymer films whose surface is softened by applying heat, preferably at $10^4$–$10^5$ poise for mechanical method and at $10^2$–$10^3$ poise for electrostatic method, respectively, measured by coaxial cylinder viscometer. Further, deposition of piles can be more effectively and economically achieved by using an extruder. That is to say, piled film is obtainable by extruding melted ethylenic copolymer to a film of predetermined thickness through an extruder and while said copolymer is still in softened condition, scattering piles thereon and pressing them after which they are hardened by cooling. Or, film which is in sufficiently softened condition as described hereinbefore is passed through an electrostatic field wherein said piles are attracted to said film by electrostatic force and deposition of piles are completed when said piled film is sufficiently cooled off and hardened thereby obtaining waterproof sheet of the present invention. Said piles may be deposited onto film in whatever manner so long as a part of individual body of piles is embedded into film body with adequate density and spacing that ensures embedding of remaining part of said piles' body into cement, asphalt or any other adhesives.

In applying waterproof sheet of the present invention to a structure, said sheet is placed on cement paste layer thereby said fibers or particles on the surface of said sheet may be embedded thereinto so that the waterproof sheet and cement paste layer come into secure contact through said fibers and particles held between them. By doing so, said waterproof sheet holds sufficient adhesion against concrete base and at the same time, upon cracking of the concrete base, the sheet is readily deformed so that it extends while losing its thickness and due to said deformation a part of said piles embedded into the sheet near the crack is snapped off or another part thereof is pulled out either from sheet or concrete sheet thereby a portion of said sheet is peeled off from cement paste layer so that the stress caused by cracking is carried over wide portions of the sheet far from cracking area, where said deformation and extension of sheet also take place. These deformation and extension of sheet are repeated continuously in accordance with the width of crack in concrete base thereby accomplishing waterproofing of structure quite satisfactorily, and these outstanding features are not to be found in any waterproof sheet known heretofore.

Figure 2:
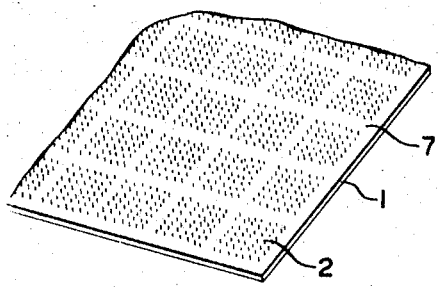
Figure 3:
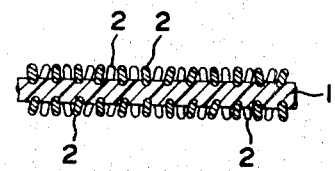
Figure 4:
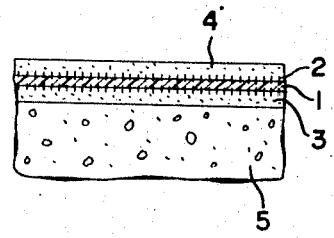
Figure 5:
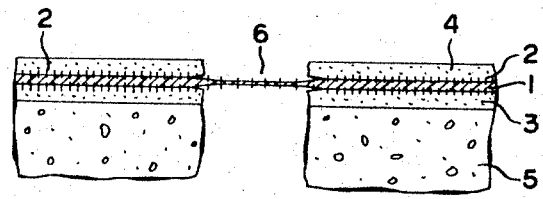
Figure 6:
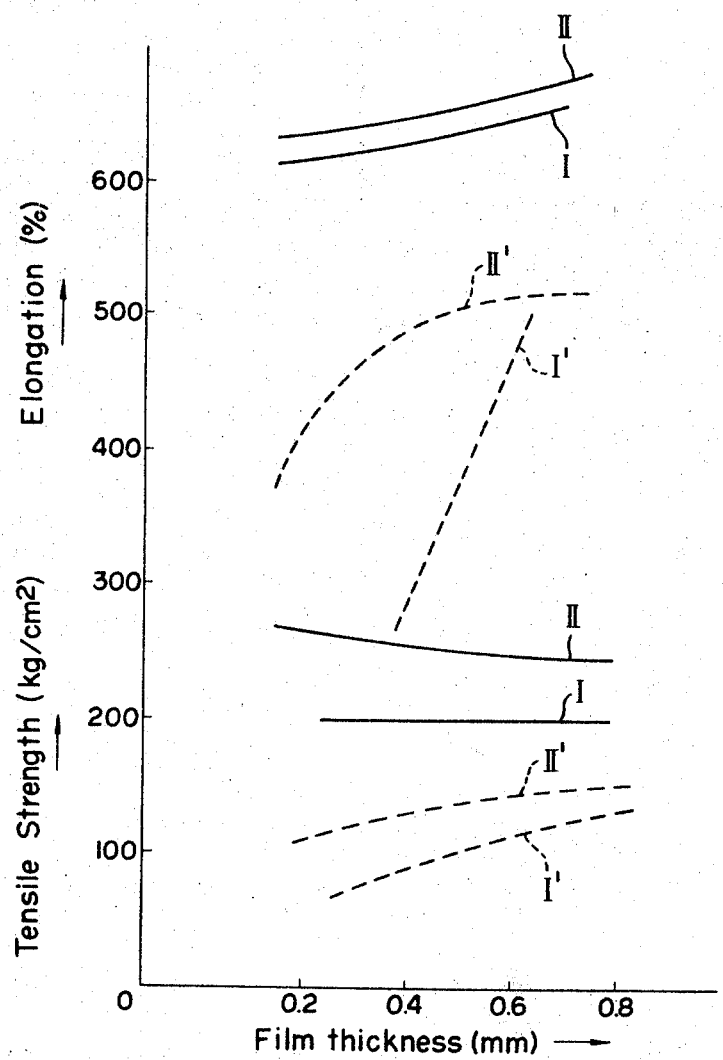
Figure 7:
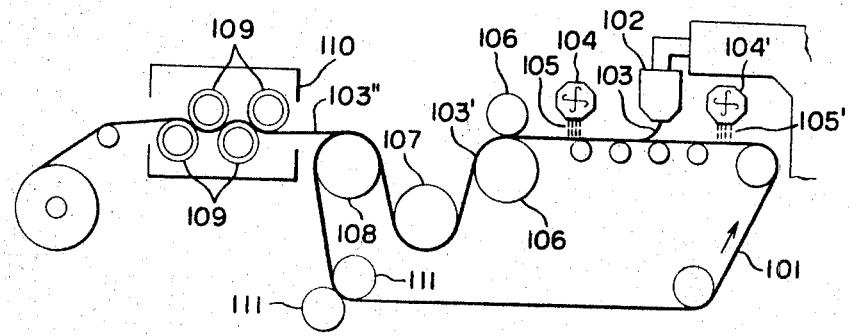

The present invention will be better understood from a consideration of the foregoing specification when read in conjunction with the accompanying drawings. FIG. 1 and FIG. 2 show perspective views of one embodiment of waterproof sheet of the present invention. FIG. 3 is an enlarged cross-sectional view of FIG. 1 along line III—III, and FIG. 4 is a cross-sectional view of one embodiment of water resistant layer of a structure using waterproof sheet of the present invention. FIG. 5 shows the condition of crack in water resistant layer described in FIG. 4, and FIG. 6 shows comparison of physical properties of polyethylene and ethylene-vinyl acetate copolymer films and piled films thereof. FIG. 7 illustrates apparatus for one embodiment of method of the present invention of depositing piles on films, and FIG. 8, likewise, shows apparatus for electrostatic method achieving same end.

In FIG. 1 and FIG. 2, number 1 shows film base, number 2 shows piles whose partial portion of body are embedded thereinto, and FIG. 1 indicates film whereon said piles 2 are deposited and adhered all over the surface thereof so that partial portions of individual body of piles are to be embedded into film body in adequate uniform density and spacing, while, FIG. 2 shows film whereon said piles are deposited not all over the surface thereof but leaving grille-like portion 7 on said film surface on which no piles are deposited. The type of sheet as described in FIG. 2 facilitates joining sheets, one to the others, by means of bonding. A film having a number of spaced small areas whereon said piles are deposited is obtained by adhering said piles 2 through a grille onto film body 1. As described hereinbefore, these piles 2 may be adhered in various manners. FIG. 3 illustrates schematically the cross-section of waterproof sheet of the present invention showing condition wherein piles 2 are partly embedded into film body 1.

FIG. 4 shows cross-sectional view of one embodiment of water resistant layer of a structure using waterproof sheet of the present invention. As a means of superposing waterproof sheet 1 upon concrete or mortar base 5, firstly cement paste 3 is applied on said mortar base 5, and secondly waterproof sheet 1 is superposed thereon before said cement paste 3 is solidified, and lastly covering mortar 4 is applied further thereon for protection of waterproof sheet 1. It is also possible at times to make use of cement paste contained in cement or mortar base 5 before it is solidified without using any additional cement paste 3 for securing adhesion, and in this case, operation is much simplified and thus cost is reduced. Covering mortar may not be required at all in some occasions and in such cases waterproof sheet 1 having piles just on one side thereof will be sufficient for the purpose. When the use of cement paste as a means of superposing waterproof sheet upon concrete base is rather difficult, or use of other adhesives than cement is considered to be recommendable, cement paste can of course be replaced with asphalt or any other adhesives.

In water resistant layer using waterproof sheet of the present invention, piles adhered onto surface of film are securely embedded into cement paste or layer of covering mortar with adhesive strength of more than 10 kg./cm.$^2$, which is over three times as much as that of asphalt waterproof sheet, therefore, as a matter of fact, base and covering mortar are securely consolidated together so that covering mortar may not be peeled off or blown off even if layer thereof is very thin. Accordingly, it can be effectively used on parapets and other uprising portion of a structure or vertical walls, particularly the effect is remarkable when applied for walls of basement cellars etc., onto which water pressure is exerted.

FIG. 5 shows condition when cracking takes place in water resistant layer illustrated in FIG. 4, and also shows extension of sheet in accordance with width of said crack. When crack 6 occurs in cement base 5, it usually affects cement layer 3 as well as waterproof sheet 1, and generally in case of sheet having low extensibility, such as asphalt sheet, crack width of even 1 millimeter in cement base 5 may cause breakage of waterproof sheet 1 quite easily. Waterproof sheet comprising conventional polyethylene film and piles adhered thereto having extensibility as high as 500% usually breaks up when crack generated in width more than 6–7 millimeters in the concrete base. Whereas, waterproof sheet of the present invention in despite of the fact that it has extensibility of about 500% which is no higher than that of the aforementioned waterproof sheet comprising polyethylene film and piles adhered thereto, withstands cracking width of more than 100 millimeters in the concrete base which is hardly conceivable in actual practice and continues to extend without any breakage. That is to say, the sheet is readily deformed in accordance with crack width of cement base so that it extends or elongates while losing thickness thereof, and due to said deformation a part of piles embedded into film body is snapped off while another part of them are pulled out from cement base thereby a certain area of said sheet is peeled off from cement layer and stress is carried over to wide portions of sheet far from cracking area which are also deformed to extend while losing thickness of sheet on such areas, and due to continuous succession of these phenomena, no matter how large the width of crack in cement base becomes, the extensibility of sheet is in complete accordance therewith and purpose of waterproofing is satisfactorily accomplished.

These phenomena described hereinabove may be explained in accordance with results of experiments performed by us as follows:

Generally speaking, as film body for waterproof sheet, thermoplastics and some synthetic rubbers may be used, however, from the standpoint of physical properties and economy, polyethylene films are preferable. However, embedding of piles into film body of conventional polyethylene damages said film with microscopic nicks and pits and decreases tensile strength and extensibility of said film to a great extent thereby causing easy breaking of such piled film, upon application on concrete, from slight width of crack in the concrete base.

These adhesive properties and extensibility of waterproof sheet described hereinabove are presumed to be governed by the following factors:

(1) Physical properties of film body and piles to be adhered thereto.

(2) Condition under which piles are adhered onto film base.

(3) Mechanism with which piles on sheet are snapped off or pulled out upon cracking of cement base.

We discovered that extensibility of ethylenic copolymers such as ethylene-vinyl acetate copolymer or ethylene-propylene copolymer rubber (EPR) having more rubber-like properties in comparison with polyethylene, is superior to polyethylene either in plain film form or in piled film form, and yet extensibility thereof is particularly higher than that of polyethylene when applied on concrete. Table 1 shows comparison of physical properties of plain sheet of polyethylene and ethylene-vinyl acetate copolymer containing 6% by weight of vinyl acetate.

by weight of vinyl acetate plain films, when applied on concrete.

TABLE 2.—ADHESIVE STRENGTH AND ELONGATION OF PILED FILMS APPLIED ON CONCRETE

| Description of piled sheet | Thickness (mm.) | Adhesive strength (kg./cm.$^2$) | Elongation (mm.) | Remarks |
|---|---|---|---|---|
| Polyethylene | 0.2 | 9.06 | 3.0 | |
| | 0.4 | 7.86 | 6.3 | |
| | 0.6 | 9.50 | 7.1 | |
| Ethylene-vinyl acetate copolymer. | 0.2 | 10.49 | 10.3 | |
| | 0.4 | 10.67 | 100 | Unbroken. |
| | 0.6 | 9.82 | 100 | Do. |

Concrete test pieces used for measurements were prepared by applying concrete layers having a given composition on both sides of waterproof sheet of the present invention and then curing and hardening them. Values for adhesive strength were obtained by pulling said test piece in vertical direction with respect to plane of waterproof sheet placed therein and measuring strength at which said test piece is pulled apart. Measuring of elongation was performed by pulling said test piece in parallel direction with respect to plane of waterproof sheet placed therein thereby giving a crack in the concrete and gradually widening the width of crack, and measuring said width at which film body of said sheet is pin-holed or broken.

In asbestos-piled sheets, there is no practical difference

TABLE 1.—PHYSICAL PROPERTIES OF PLAIN SHEET

| Item | Unit | Measuring method | Polyethylene | Ethylene-vinyl acetate copolymer |
|---|---|---|---|---|
| Tensile strength | Kg./cm.$^2$ | JISZ 1702 | 204–205 | 260–280 |
| Elongation | Percent | JISZ 1702 | 542–691 | 590–750 |
| Tear strength (shopper) | Kg./cm.$^2$ | JISK 6781 | 81–90 | 87–90 |
| Tear strength (Elmendorf) | Kg./cm | JISZ 1702 | 35–67 | 42–73 |
| Dartdrop impact strength (60″ height). | G | ASTM D 1769–62T | 180 | 600 |
| Modulus of elasticity | Kg./cm.$^2$ | | 1,700–1,800 | 910–970 |

The amount of vinyl acetate to be contained in said ethylene-vinyl acetate copolymers is preferably 3–50% by weight, particularly, amount of 6–10% by weight based on the weight of the copolymer gives excellent result for the present purpose. Although values for elastic limit are not shown, ethylene-vinyl acetate copolymers have greater value than that of polyethylene. Ethylene-vinyl copolymers containing 6% by weight of vinyl acetate may be considered to be a polymer to which rubber-like properties are given without decreasing mechanical strength of polyethylene.

FIG. 6 illustrates relationships between film thickness and physical properties observed in plain films and piled films of polyethylene and ethylene-vinyl acetate copolymer containing 6% by weight of vinyl acetate on either of which fibers of asbestos are deposited. In FIG. 6, references I and II designate plain film of polyethylene and ethylene-vinyl acetate copolymer containing 6% by weight of vinyl-acetate, respectively, and references I' and II' designate said films on which asbestos fibers are deposited, respectively.

As shown in FIG. 6, both elongation and tensile strength of piled films are considerably decreased in comparison with plain films of same composition. The reason is that embedding of piles into film body gives same effect as surface of film is damaged, or pitted. However, upon comparing I' with II', particularly with respect to the elongation, it is noted that sheet of II' is relatively unaffected with thickness thereof and sustains elongation of more than 400% even at thickness of 0.2 millimeter.

Table 2 shows result of measurings on adhesive strength and elongation of asbestos-piled sheets prepared from polyethylene and ethylene-vinyl acetate containing 6% between polyethylene and ethylene-vinyl acetate copolymer in regard to adhesive strength, namely, 7.86 kg./cm.$^2$ for polyethylene and 10.67 kg./cm.$^2$ for said copolymer, respectively, however, remarkable difference is observed with respect to the elongation faculty. Namely, while polyethylene film breaks at width of 6–7 millimeters, said copolymer film neither have pin-holes on film body nor breaks even at width of more than 100 millimeters.

It is considered that reason is that inasmuch as plain sheet of said copolymer has more rubber-like properties than that of polyethylene, elastic deformation thereof facilitates disconnection of piles embedded into film body and also said rubber-like properties provides better elongation without breakage despite of damaged or pitted film surface because of such embedding of piles thereinto.

From the foregoing results, it is understood that waterproof sheet having adhesive strength of more than 10 kg./cm.$^2$ and unbreakable at crack width in concrete of more than 100 millimeters is obtained by bonding piles onto film of elastic ethylenic copolymers such as ethylene-vinyl acetate copolymer having low modulus of elasticity and rubber-like properties in comparison with polyethylene.

The present invention is further practically explained in the following examples, however, it should not be construed that these examples restrict the present invention in any way.

EXAMPLE 1

In this example, pressing method of depositing piles onto film is explained referring to FIG. 7. Ethylene-vinyl acetate copolymer containing 6% by weight of vinyl acetate film 103 of 0.2 millimeter thickness is extruded onto Teflon-coated endless belt 101 from extruder 102 at a temperature of 200° C. and while said film is still in sufficiently softened condition, asbestos piles 105 through 14-mesh sieve 104 is scattered evenly thereon and said film is pressed through a pair of squeezing rolls 106, 106 after which said film is cooled off and hardened. In case of depositing piles on both sides of film, piles 105' is scattered on said endless belt 101 through sieve 104' beforehand and film 103 is extruded thereon. Piled film 103' is sufficiently cooled by subsequently located cooling rolls 107 and 108, and hardened copolymer film 103'' comes off from said endless belt 101.

For said endless belt 101, inasmuch as it must be heat resistant and as it requires easy release of film therefrom, soft and non-elastic materials, if necessary, coated with Teflon or silicone rubber, are used.

Nextly, film 103'' passes through a group of brushing rolls 109 where excessive or insufficiently bonded piles are brushed off and by eliminating these insufficiently deposited piles with sucking device 110, an asbestos-piled film having enough adhesive strength is obtained. Said endless belt 101 is driven by rubber-lined squeezing rolls 111, 111 at a constant speed.

EXAMPLE 2

Figure 8:
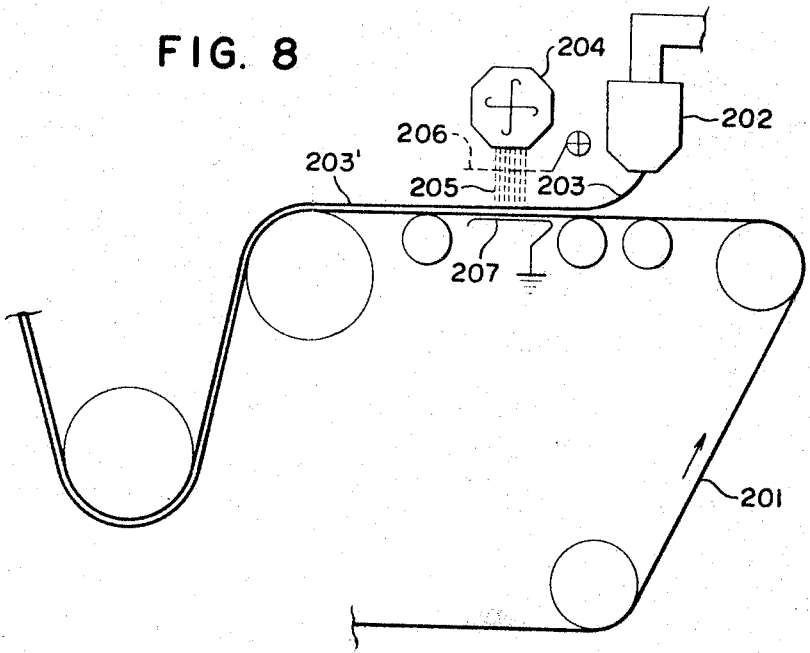

In the present example, electrostatic method of depositing piles onto film is explained in conjunction with FIG. 8.

Ethylene-vinyl acetate copolymer containing 6% by weight of vinyl acetate film 203 at thickness of 0.5 millimeter extruded onto an endless belt 201 from an extruder 102 is heated by infrared lamp (not shown) and while said film is sufficiently softened condition, said film 203 is passed through an electrostatic field created by electrodes 206 and 207, placed at distance of 100 millimeters and voltage of 20,000 volts. Nylon piles 205 are placed in said electrostatic field wherein said piles are attracted to said film 203 through a sieve 204 by attractive force created by said electrostatic field thereby said piles are deposited onto said film. After eliminating insecurely adhered piles by suction, a beautiful nylon-piled film is obtained.

What we claim is:

1. Water proof sheet comprising a film base of at least a member selected from the group consisting of ethylene-vinyl acetate copolymer and ethylene-propylene copolymer, and asbestos piles adhered to at least one side of said film, said piles including parts embedded in the said film.

2. A waterproofed structure comprising a waterproof sheet comprising a film base of at least one member selected from the group consisting of ethylene-vinyl acetate copolymer and ethylene-propylene copolymer, and asbestos piles adhered to at least one side of said film, said piles including parts embedded in the said film and a hydraulic cement layer adhered to at least one side of said sheet through the intermediary of said asbestos piles, said waterproof sheet being adapted for extension to more than 10 mm. before cracking occurs in said hydraulic cement layer.

References Cited

UNITED STATES PATENTS

| 1,644,652 | 10/1927 | Kirschbraun | 156—276 XR |
| 2,185,195 | 1/1940 | Harshberger | 161—236 XR |
| 2,494,848 | 1/1950 | Whitlegg | 161—53 |
| 2,695,257 | 11/1954 | Castellani | 156—71 XR |
| 2,909,443 | 10/1959 | Wolinski | 117—16 |
| 2,991,208 | 4/1961 | Stieger | 161—53 |
| 3,275,487 | 9/1966 | Lemelson | 156—72 |
| 3,343,370 | 9/1967 | Twele et al. | 156—279 XR |

ROBERT F. BURNETT, *Primary Examiner.*

WILLIAM A. POWELL, *Assistant Examiner.*

U.S. Cl. X.R.

117—17, 93.4; 156—72, 276, 283; 161—67, 205; 264—131